United States Patent
Chitnis et al.

(10) Patent No.: US 12,242,379 B2
(45) Date of Patent: Mar. 4, 2025

(54) SOFTWARE SHARING ACROSS MULTIPLE CORES

(71) Applicant: TEXAS INSTRUMENTS INCORPORATED, Dallas, TX (US)

(72) Inventors: Kedar Chitnis, Bangalore (IN); Mihir Narendra Mody, Bangalore (IN); Prithvi Shankar Yeyyadi Anantha, Bangalore (IN); Sriramakrishnan Govindarajan, Bangalore (IN); Mohd Farooqui, Bangalore (IN); Shailesh Ghotgalkar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 74 days.

(21) Appl. No.: 18/082,693

(22) Filed: Dec. 16, 2022

(65) Prior Publication Data

US 2024/0037028 A1 Feb. 1, 2024

Related U.S. Application Data

(60) Provisional application No. 63/392,549, filed on Jul. 27, 2022.

(51) Int. Cl.
*G06F 12/02* (2006.01)

(52) U.S. Cl.
CPC ................ *G06F 12/0292* (2013.01)

(58) Field of Classification Search
CPC .................................................. G06F 12/0292
USPC .......................................................... 711/202
See application file for complete search history.

(56) References Cited

U.S. PATENT DOCUMENTS

| | | | |
|---|---|---|---|
| 2006/0179244 A1* | 8/2006 | Goodman | G06F 12/0817 711/141 |
| 2016/0283399 A1* | 9/2016 | Das Sharma | G06F 13/4282 |
| 2018/0007226 A1* | 1/2018 | Holland | H04N 1/2133 |
| 2019/0075063 A1* | 3/2019 | McDonnell | H04L 49/70 |
| 2019/0347133 A1* | 11/2019 | Simmons | G06F 8/441 |

* cited by examiner

*Primary Examiner* — Gautam Sain
(74) *Attorney, Agent, or Firm* — Xianghui Huang; Frank D. Cimino

(57) ABSTRACT

In an example, a method includes storing code for a first central processing unit (CPU) executing a first application in a first region of a memory, and storing code for a second CPU executing a second application in a second region of the memory. The method includes storing shared code for the first CPU and the second CPU in a third region of the memory. The method includes storing read-write data for the first CPU in a fourth region of the memory and storing read-write data for the second CPU in a fifth region of the memory. The method includes translating a first address from a first unique address space for the first CPU to a shared address space in the third region, and translating a second address from a second unique address space for the second CPU to the shared address space in the third region.

20 Claims, 11 Drawing Sheets

| 502 | 504 | 506 | 508 | 510 |
|---|---|---|---|---|
| SYMBOL | SHARED ADDRESS SPACE | CPU1 LOAD ADDRESS | CPU2 LOAD ADDRESS | REMARKS |
| A | 0X1000 | 0X1000 | N/A | CPU1 UNIQUE |
| B | 0X2000 | N/A | 0X2000 | CPU2 UNIQUE |
| F1 | 0X3000 | 0X3000 | 0X3000 | CODE, COMMON LOAD ADDRESS |
| D0 | 0X4000 | 0X4000 | 0X4000 | RO DATA, COMMON LOAD ADDRESS |
| D1 | 0X5000 | 0X5000 | 0X6000 | RW DATA, CPU UNIQUE LOAD ADDRESS |

Rows annotated 512, 514, 516, 518, 520 (for A, B, F1, D0, D1 respectively). Table reference 500.

FIG. 5

SOFTWARE SHARING ACROSS MULTIPLE CORES

CROSS-REFERENCE TO RELATED APPLICATION

This application claims priority to U.S. Provisional Patent Application No. 63/392,549 which was filed Jul. 27, 2022, is titled "OPTI-SHARE: METHOD AND SYSTEM FOR SOFTWARE SHARING ACROSS MULTIPLE CORES IN AN MCU," and is hereby incorporated herein by reference in its entirety.

BACKGROUND

High performance microcontrollers may have multiple processing cores, such as two or four cores. The microcontroller may be embodied within a system-on-a-chip (SOC). The SOC may include additional hardware and software that is shared among the processing cores, such as memory, interconnects, input/output ports, communications hardware, etc. In some SOCs, each processing core may execute an application that is independent of the other processing cores.

SUMMARY

In accordance with at least one example of the description, a method includes storing code for a first central processing unit (CPU) executing a first application in a first region of a memory in a microcontroller. The method also includes storing code for a second CPU executing a second application in a second region of the memory in the microcontroller. The method includes storing shared code for the first CPU and the second CPU in a third region of the memory in the microcontroller. The method also includes storing read-write data for the first CPU in a fourth region of the memory in the microcontroller. The method includes storing read-write data for the second CPU in a fifth region of the memory in the microcontroller. The method also includes translating a first address from a first unique address space for the first CPU to a shared address space in the third region of the memory. The method includes translating a second address from a second unique address space for the second CPU to the shared address space in the third region of the memory.

In accordance with at least one example of the description, a method includes executing a first function with a first CPU in a microcontroller, where the first function reads first data stored in a first memory region in the microcontroller. The method also includes executing a second function with a second CPU in the microcontroller, where the second function reads the first data stored in the first memory region in the microcontroller, where the first memory region stores data common to the first function and the second function. The method includes executing a third function with the second CPU in the microcontroller, where the third function reads second data stored in a second memory region in the microcontroller, where the second memory region stores data unique to the second CPU.

In accordance with at least one example of the description, a microcontroller includes a first CPU and a second CPU, where the first CPU is configured to execute a first application and the second CPU is configured to execute a second application. The microcontroller includes a memory configured to store code and data, where the memory is internal to the microcontroller, and where the memory has a first region configured to store code for the first CPU, a second region configured to store code for the second CPU, a third region configured to store shared code and read-only data for both the first CPU and the second CPU, a fourth region configured to store read-write data for the first CPU, and a fifth region configured to store read-write data for the second CPU. The microcontroller includes a first address translation unit configured to receive a first address from the first CPU in a first CPU unique address space and translate the first address to a shared memory address space in the third region of the memory. The microcontroller also includes a second address translation unit configured to receive a second address from the second CPU in a second unique address space and translate the second address to the shared memory address space in the third region of the memory.

BRIEF DESCRIPTION OF THE DRAWINGS

FIG. 5 is a table for address remapping and relinking in accordance with various examples.

The same reference numbers or other reference designators are used in the drawings to designate the same or similar (functionally and/or structurally) features.

DETAILED DESCRIPTION

Figure 1:
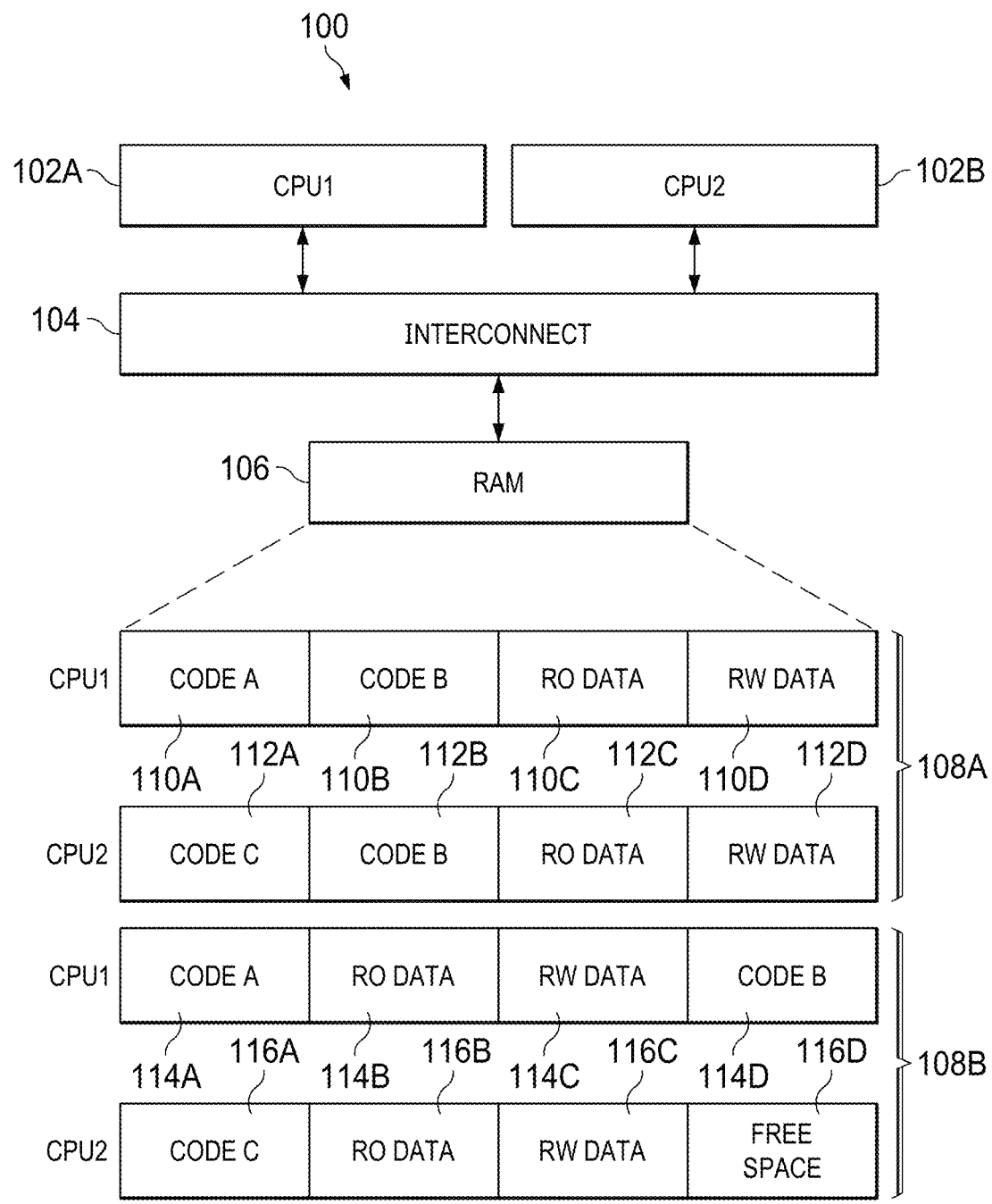
FIG. 1 is a block diagram for software sharing across multiple processing cores in accordance with various examples.

A microcontroller unit (MCU) is a computer located on an integrated circuit (IC) chip. Many MCUs are low-cost units developed for a specific purpose, such as an embedded system in an automotive or industrial application. An MCU may have multiple central processing unit (CPU) cores to meet computing requirements, such as two cores, four cores, eight cores, etc. MCUs may also have on-chip memory, such as on-chip random access memory (RAM). The amount of RAM or other memory on-chip is often limited, due to cost. In MCUs, the applications that are executed by the processing cores are often developed on a personal computer. A different application may be executed by each processing core, and the use case of the MCU may be fixed. A fixed use case means that the applications are developed and loaded onto the MCU, and then the applications are rarely updated. Each application may use common software libraries and functions, such as the same real time operating system (RTOS), same direct memory access (DMA) drivers, same networking stack, etc. MCUs often do not have memory management units (MMU). Therefore, the processing cores do not have the capability of using virtual address space via the MMU; rather, the processing cores use the physical address space of the existing on-chip RAM.

Even though each processing core executes an independent application, some of the code or read-only data of the applications may be duplicated across more than one application. This duplicated code and/or data is then stored on the RAM multiple times, so it may be accessed by the corresponding processing core and the associated application being executed. However, with limited internal memory, the MCU may run short of memory in some use cases. Storing identical code or data multiple times is an inefficient use of the limited MCU memory.

In examples herein, applications to be executed on each processing core are analyzed to identify common shared code and/or data segments among the applications. The term data as used herein may also refer to code. Software or algorithms may be useful for analyzing the applications and finding the common code and/or data. After analyzing the applications or application binaries, new binaries may be created. The new binaries may include a unique binary for each processing core that includes no common code/data, and a binary that includes shared code, read-only data common to two or more processing cores, and shared read-write data. After the applications are analyzed, a bootloader may be updated to load the unique code/data for each processing core, load the shared code and read-only data once, and load read-write data multiple times, once for each processing core. By loading shared code and read-only data once rather than multiple times, memory usage may be reduced. The amount of the reduction depends on how much shared code/data exists between the applications.

The new binaries may be mapped to a common shared memory space in the internal memory. During operation, the MCU may utilize a low-latency hardware translation to translate addresses from the CPU-unique address space of each processing core to the shared memory address space. A lookup table or comparator may perform address translation using a 1:1 mapping of addresses. Hardware translation logic may be useful in some examples. Address translation hardware may be coupled to each processing core. With this address translation scheme, a memory management unit (MMU) is not needed, and the examples herein may be implemented on an MCU. In other examples, the memory may be external memory, and any type of memory may be useful in the examples described herein.

FIG. 1 is a block diagram 100 for software sharing across multiple processing cores in accordance with various examples herein. Diagram 100 includes example hardware components of a microcontroller and two examples of memory usage: one without software sharing and one with software sharing. Diagram 100 includes a CPU1 102A and CPU2 102B (collectively, CPUs 102). CPUs 102 may also be referred to herein as processor cores 102. In this example, two CPUs 102 are shown, but other examples may include more CPUs 102, such as four or eight CPUs 102. Each CPU 102 is a processor core that executes an application. CPUs 102 are coupled to interconnect 104, which is coupled to RAM 106. RAM 106 is memory that is configured to store code and/or data that is accessed by CPUs 102 via interconnect 104 during execution of the applications by CPUs 102. RAM 106 may also be referred to as memory 106 in examples herein. Memory 106 may be a memory type other than RAM in some examples. In examples described herein, memory 106 may be internal or external memory, or a combination of the two. Memory 106 may be any type of memory. Memory 106 may be static RAM (SRAM), dynamic RAM (DRAM), flash memory, or any type of non-volatile memory. Memory 106 may also be external flash, external DRAM, double data rate (DDR) memory, etc., in some examples.

Diagram 100 also shows example data storage schemes within RAM 106. Data storage scheme 108A shows data stored in RAM 106 without software sharing. Data storage scheme 108B shows data stored in RAM 106 with software sharing in accordance with various examples herein. In data storage scheme 108A without software sharing, code and data stored for CPU1 102A in RAM 106 includes code 110A (Code A), common code/data 110B (Code B), read-only (RO) data 110C, and read-write (RW) data 110D. Code 110A is code unique to the application executed by CPU1 102A. Common code/data 110B includes code and/or data that is non-unique, and is also common to an application executed by another CPU, such as CPU2 102B. RO data 110C is RO data that is unique to CPU1 102A. RW data 110D is RW data that is unique to CPU1 102A.

In data storage scheme 108A, similar types of code and data are stored for CPU2 102B. Code and data stored for CPU2 102B in RAM 106 includes code 112A (Code C), common code/data 112B (Code B), RO data 112C, and RW data 112D. Code 112A is code unique to the application executed by CPU2 102B. Common code/data 112B (Code B) includes code and/or data that is non-unique, and is identical to common code/data 110B (Code B) stored for CPU1 102A. RO data 112C is RO data that is unique to CPU2 102B. RW data 112D is RW data that is unique to CPU2 102B.

Data storage scheme 108A shows that some code/data is duplicated and stored multiple times in RAM 106 (e.g., common code/data 110B and 112B (Code B)). Duplicating this code/data and storing it multiple times in RAM 106 takes up space in RAM 106 that could otherwise be utilized, which is useful in microcontrollers that may have limited memory. Data storage scheme 108B shows data stored in RAM 106 with software sharing, which frees up memory space. In data storage scheme 108B, code and data stored for CPU1 102A in RAM 106 includes code 114A (Code A), RO data 114B, RW data 114C, and common code/data 114D (Code B). Code 114A is code unique to the application executed by CPU1 102A. RO data 114B is RO data that is unique to CPU1 102A. RW data 114C is RW data that is unique to CPU1 102A. Finally, common code/data 114D (Code B) is code and/or data that is shared by both CPU1 102A and CPU2 102B.

In data storage scheme 108B, code and data stored for CPU2 102B in RAM 106 includes code 116A (Code C), RO data 116B, and RW data 116C. Code 116A is code unique to the application executed by CPU2 102B. RO data 116B is RO data that is unique to CPU2 102B. RW data 116C is RW data that is unique to CPU2 102B. In this example, common code/data for CPU2 102B is not duplicated and stored twice. Rather, CPU2 102B accesses common code/data 114D (Code B) as needed during execution of an application. By not duplicating common code/data 114D (Code B), free space 116D is created in RAM 106. Therefore, with software sharing as described in examples herein, memory space may be freed in RAM 106.

In this example, two CPUs 102 are shown. In other examples, more than two CPUs 102 may be present in the microcontroller. In examples herein, software sharing may be implemented for any two or more CPUs 102 in the microcontroller. For example, if four CPUs 102 are present, the applications executed by the four CPUs 102 may be analyzed, and code/data common to all four CPUs 102 may be stored in a first region of memory. In the same microcontroller, if code/data is found that is common to only two of the four CPUs 102, the code/data common to those two CPUs 102 may be stored in a second region of memory. If code/data is found that is common to only three of the four CPUs 102, the code/data common to those three CPUs 102 may be stored in a third region of memory. The memory may be divided into any number of regions for storing code/data common to any combination of CPUs 102 in examples herein. Each CPU 102 also has a dedicated memory region specific to that CPU 102 for code, RO data, and RW data, as described above.

Figure 2:
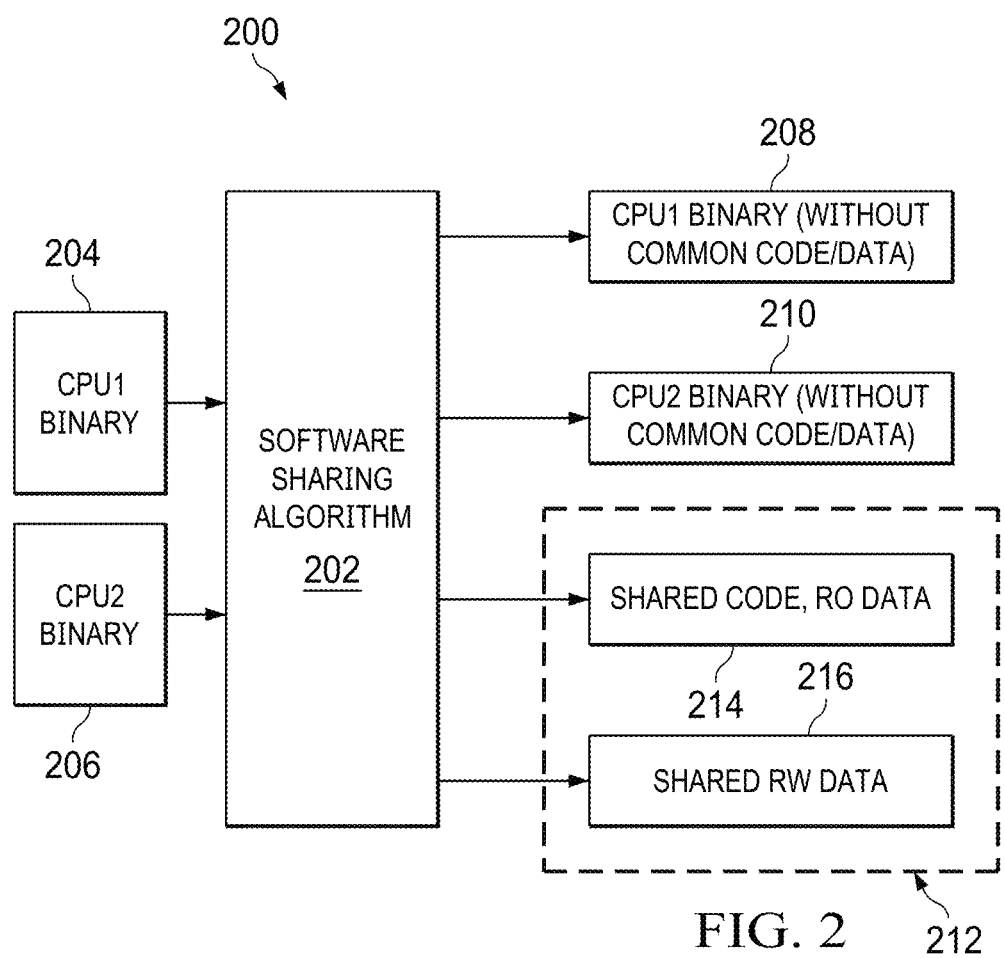
FIG. 2 is a block diagram of an example software sharing algorithm in accordance with various examples.

FIG. 2 is a block diagram 200 of a software sharing algorithm in accordance with various examples herein. Diagram 200 shows the inputs and outputs of one example software sharing algorithm 202, which may be part of a compiler or other program development tool. In this example, software sharing algorithm 202 receives two inputs and produces four outputs. In other examples, more inputs and outputs may be present. For example, more than two application binaries may be provided to software sharing algorithm 202. Software sharing algorithm 202 may be executed on any suitable computing platform, such as a personal computer.

To begin, software sharing algorithm 202 receives binaries of the applications that will be executed by the processor cores in a microcontroller. In this example, the microcontroller has two processor cores (CPU1 102A and CPU2 102B). CPU1 binary 204 and CPU2 binary 206 are provided to software sharing algorithm 202. The binaries may include a unique address space for each CPU 102 in memory 106. The binaries may also include symbol table information. Symbol tables are data structures created and maintained by the compiler to keep track of semantics of variables. The symbol table stores information about instances of various entities such as variable and function names, classes, objects, etc. Software sharing algorithm 202 receives the binaries and any other application information and produces four outputs in this example. A description of one example operation of software sharing algorithm 202 is provided below.

Software sharing algorithm 202 receives N application binaries (where N is an integer) and produces N+1 binaries by detecting duplicate code and/or data that can be shared between the applications. The N+1 binaries includes N binaries with unique code/data for each application, and one binary that contains shared code, shared RO data, and shared RW data. The binaries may be mapped to a common shared memory address space in RAM 106. As an example, software sharing algorithm 202 produces CPU1 binary 208, CPU2 binary 210, and shared binary 212. CPU1 binary 208 includes code/data unique to CPU1 binary 204, and does not include any common code/data. CPU2 binary 210 includes code/data unique to CPU2 binary 206, and does not include any common code/data. Shared binary 212 includes shared code and RO data 214 and shared RW data 216. After software sharing algorithm 202 creates the new binaries, the code/data provided by software sharing algorithm 202 is stored in specific memory regions in memory 106 of the microcontroller, as shown in FIG. 1. Address translation may be performed for some of the code/data stored in memory 106 during execution of the applications by the microcontroller, as described below.

Figure 3:
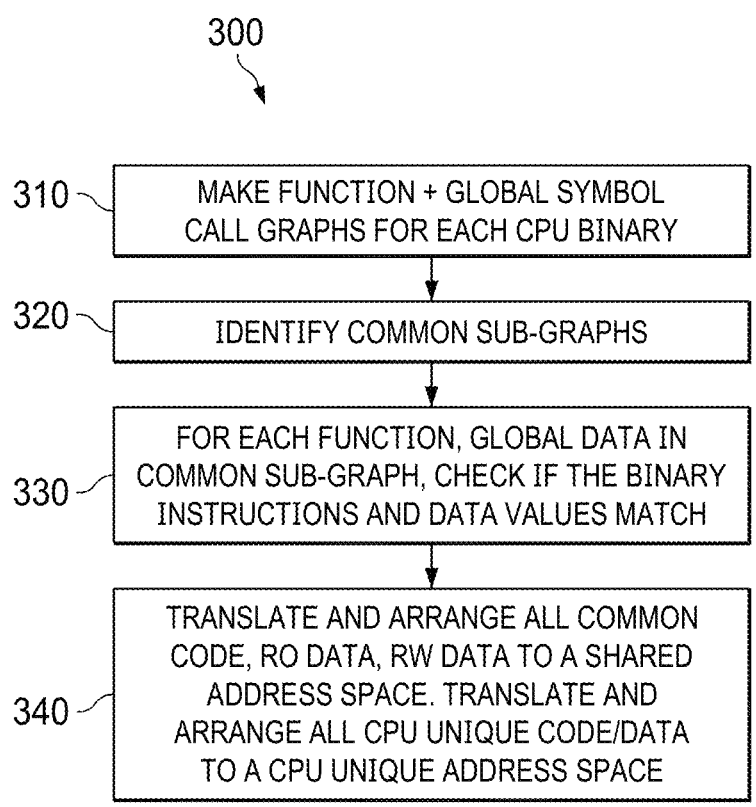
FIG. 3 is a flow diagram of a method for identifying common shared code and data across multiple applications in accordance with various examples.

FIG. 3 is a flow diagram of a method 300 for identifying common shared code and data across multiple applications in accordance with various examples herein. Method 300 is one example of a software sharing algorithm, such as software sharing algorithm 202. Additional details of identifying common shared code and data is described below with respect to FIGS. 4 and 5. The steps of method 300 may be performed in any suitable order. Any suitable hardware or digital logic may perform method 300 in some examples. In one example, the hardware described with respect to FIG. 12 below may be programmed or configured to execute instructions that cause a processor to perform a software sharing algorithm as described with respect to FIGS. 3-6 herein.

Method 300 begins at 310, where each CPU binary is analyzed to create function plus global symbol call graphs for each CPU binary. Call graphs identify the dependencies between functions and data in a CPU binary. If the same function or global symbol appears in two different CPU binaries, then that function and global symbol may be useful as a starting point to identify common shared code/data between the two CPU binaries. This step is performed for each CPU binary. As described above, more than two CPU binaries may be analyzed. If more than two CPU binaries are analyzed, functions or global symbols that are common to all the CPU binaries may be found at 310. Method 300 may also identify functions or global symbols that are common to less than all the CPU binaries, such as common to only two, three, or four of the CPU binaries.

After function plus global symbol call graphs are determined for each CPU binary, method 300 continues at 320, where common sub-graphs are identified. Sub-graphs are smaller portions of the call graphs, and these are analyzed to find commonality. Common sub-graphs help to refine the potential common shared code/data between the CPU binaries. As an example, if a symbol name is the same across two CPU binaries, a common sub-graph may be present. The functions or data references associated with the symbol name are analyzed. If the functions or data references do not match, the symbol is not an example of shared code/data. If the functions or data references match, the symbol may be an example of shared code/data. Therefore, at 320, method 300 analyzes the common code/data starting points found in 310 and refines the analysis to determine if common shared code/data is actually present across the CPU binaries.

Method 300 proceeds to 330, where, for each function and global data in a common sub-graph, binary instructions and data values are analyzed to find a match. If a sub-graph matches, the code/data may not be common because the function may execute different local instructions or it may use different initialized data values. In those cases, common code/data is not present between the sub-graphs. At 330, method 300 further refines the potential common code/data to determine if shared code/data is present across the analyzed CPU binaries. In some examples, the addresses in the instructions or functions identified in the call graphs may be ignored when determining whether a match is found. The addresses referenced in common code across CPUs may be different because the CPU binaries each have a CPU unique address space, but the common code will be stored once in the memory. The address translation process will translate the CPU unique addresses to the correct addresses in the shared memory address space during execution of the applications on the CPUs. Therefore, the addresses in the call graphs may not match, but the functions and data could indicate common code. The final collection of shared code/data is found at 330.

Method 300 proceeds to 340, where a compiler receives the shared code/data across the CPU binaries. The compiler translates and arranges all common code, RO data, and shared RW data to a shared address space in memory 106. Also, the compiler translates and arranges the CPU unique code/data to a CPU unique address space for each CPU. The binaries for each CPU are updated with the new addresses. The common code section includes shared code and data, and if the original application accesses the common code, the application jumps to where the common code is stored in the shared address space in memory 106. Therefore, only one copy of the common code is stored. After this step, the real time address translation may be programmed.

After 340, an updated bootloader loads the CPU-unique code/data once, loads the shared code/RO data once, and loads the shared RW data multiple times, once for each CPU. The bootloader updates the address translation units such that the CPU-unique address space and the shared address space map to the actual physical memory address space in memory 106. As an example, the call graph for an application being executed by a CPU may include an instruction to jump to an original address (e.g., an address in the CPU unique address space). The address translation unit programs the new address in the shared code region in place of the original address. The address translation unit may be a lookup table or a comparator in some examples.

Figure 4:
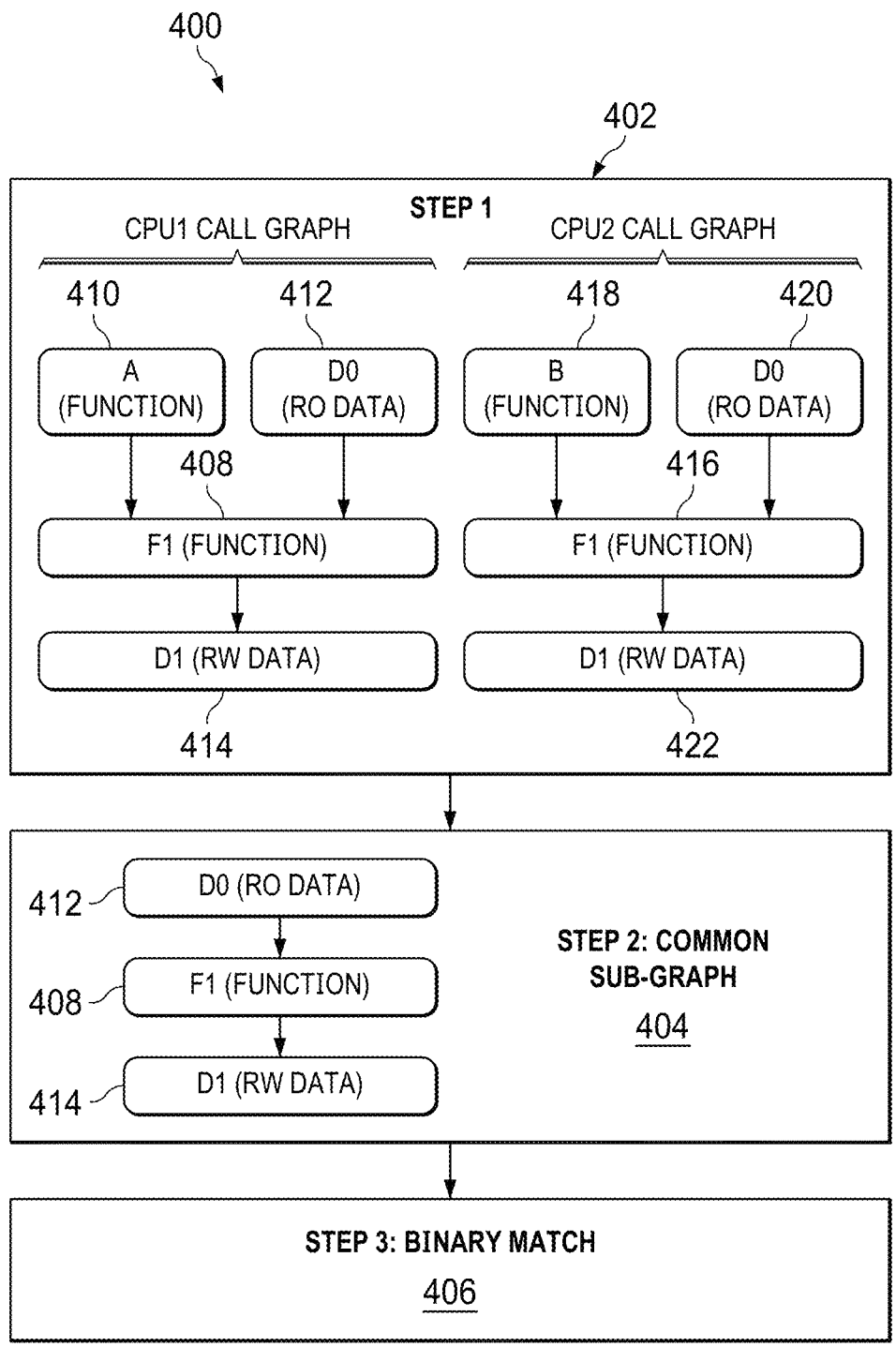
FIG. 4 is a block diagram of a software sharing algorithm in accordance with various examples.

FIG. 4 is a block diagram 400 of a software sharing algorithm in accordance with various examples herein. FIG. 4 includes three steps: step one 402, step two 404, and step three 406. Step one 402 is similar to 310 above, where each CPU binary is analyzed to create function plus global symbol call graphs for each CPU binary. In this example, two binaries are analyzed and an example call graph is shown in FIG. 4. Call graphs identify the dependencies between functions and data in a CPU binary.

Step one 402 shows a call graph for CPU1 102A on the left and a call graph for CPU2 102B on the right. The call graph for CPU1 102A includes a function F1 408, function A 410, RO data D0 412, and RW data D1 414. The call graph for CPU2 102B includes a function F1 416, function B 418, RO data D0 420, and RW data D1 422. As described above, if the same function or global symbol appears in two different CPU binaries, then that function and global symbol may be useful as a starting point to identify common shared code/data between the two CPU binaries. In this example, function F1 is common to both call graphs (e.g., 408 and 416). Also, RO data D0 is common to both call graphs (412 and 420), and RW data D1 is common to both call graphs (414 and 422). Therefore, function F1, RO data D0, and RW data D1 may be selected as a starting point to identify common shared code/data between the two binaries.

Step two 404 shows the common shared code/data (e.g., the common sub-graph) that was identified in step one 402. The common sub-graph includes function F1 408, RO data D0 412, and RW data D1 414. One common sub-graph is shown in this example, but any number of common sub-graphs may be present in other examples.

Step three 406 shows the binary match step, which is similar to 330 described above. For each function and global data in the common sub-graph identified in step two 404, binary instructions and data values are analyzed to find a match. If shared code/data is determined in step three 406, the shared code/data may be collected for the compiler to translate and arrange the new binaries using the shared address space. The compiler translates and arranges all common code, RO data, and shared RW data to a shared address space in memory 106. Also, the compiler translates and arranges the CPU unique code/data to a CPU unique address space for each CPU.

FIG. 5 is an example table 500 for address remapping and relinking in accordance with various examples herein. Table 500 may result from the steps described above with respect to FIG. 4 in one example. Table 500 includes five columns. Column 502 includes the symbol name for the various functions and data identified in FIG. 4 above. Column 504 indicates the location of the shared address space for the various symbols. Column 506 indicates the CPU1 load address for the symbol. Column 508 indicates the CPU2 load address for the symbol. Column 510 is a descriptor for each row in the column.

In table 500, the first row 512 shows the symbol A (e.g., function A 410). As described above with respect to FIG. 4, function A 410 is found in the CPU1 call graph but not in the CPU2 call graph. Function A 410 is code that is unique to CPU1. The shared address space for function A 410 is 0x1000. The CPU1 load address is 0x1000 as well. In column 508, the CPU2 load address is not application (NA), because the function A 410 is unique to CPU1.

The second row 514 shows the symbol B (e.g., function 418). As described above with respect to FIG. 4, function B 418 is found in the CPU2 call graph but not in the CPU1 call graph. Function B 418 is code that is unique to CPU2. The shared address space for function B 418 is In column 506, the CPU1 load address is NA, because the function B 418 is unique to CPU2. The CPU2 load address is 0x2000 as well (column 508). In this example, the unique code for CPU1 is located at 0x1000, and the unique code for CPU2 is located in 0x2000 in the shared memory address space.

The third row 516 shows the symbol F 1 (e.g., function 408 and 416). Function F 1 was common to both CPU1 and CPU2 as shown in FIG. 4. The common code for function F1 is stored beginning at 0x3000. Because this code is common to both CPUs, the CPU1 load address and the CPU2 load address are identical, and are also 0x3000.

The fourth row 518 shows the symbol DO (412 and 420). DO is the common RO data found in FIG. 4. This RO data D0 was found in both call graphs for CPU1 and CPU2. The common code for RO data D0 is stored beginning at 0x4000. The CPU1 load address and the CPU2 load address are also 0x4000.

The fifth row 520 shows the symbol D1 (414 and 422). D1 is the common RW data found in FIG. 4. This RW data D1 was found in both call graphs for CPU1 and CPU2. The common code for RW data D1 is stored beginning at 0x5000. Because this is RW data, CPU1 and CPU2 have different load addresses, as this data may be written independently by the CPUs during execution of the applications. As shown in table 500, the CPU1 load address (column 506) is 0x5000. The CPU2 load address (column 508) is 0x6000. Therefore, RW data is duplicated and stored for each CPU, so each CPU has a unique load address.

Table 500 shows that common code for function F1 and RO data D0 is stored once in the shared memory space and may be accessed by either CPU1 or CPU2. By storing this common code and data only once, space may be saved in the memory 106. In other examples, more than two call graphs may be created for more than two CPUs, and common code and data may be determined across any combination of the CPUs.

Figure 6:
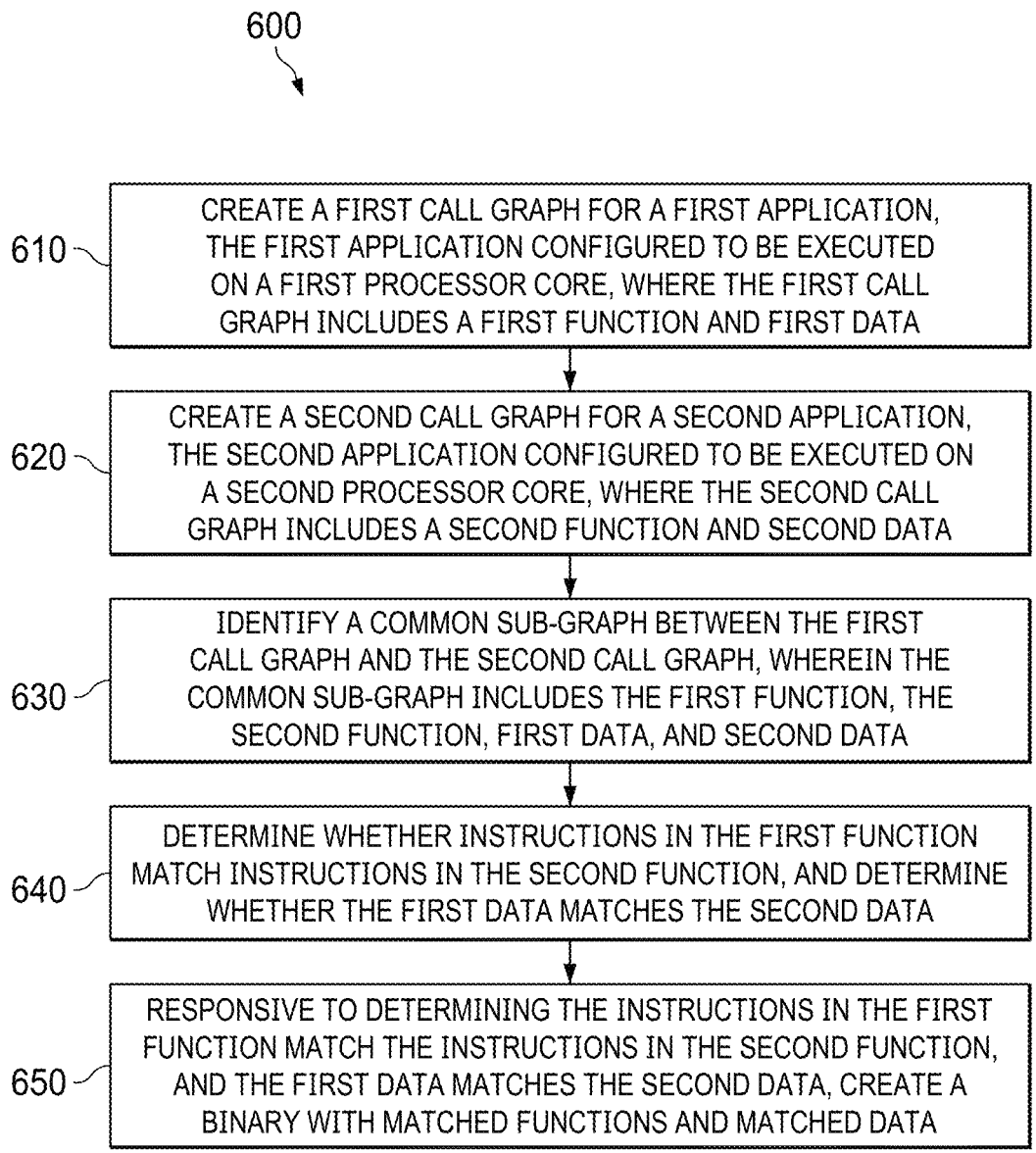
FIG. 6 is a flow diagram of a method for identifying common shared code and data across multiple applications in accordance with various examples.

FIG. 6 is a flow diagram of a method 600 for identifying common shared code and data across multiple applications in accordance with various examples herein. Method 600 is one example of a software sharing algorithm, such as software sharing algorithm 202. The steps of method 600 may be performed in any suitable order. Any suitable hardware or digital logic may perform method 600 in some examples. A software program executing on a personal computer may perform method 600 in an example.

Method 600 begins at 610, where a first call graph is created for a first application, the first application configured to be executed on a first processor core. In this example, the first call graph includes a first function and first data. As described above with respect to FIG. 4, a call graph for a first application to be executed on a first CPU may include a function F1 408 and RO data D0 412.

Method 600 continues at 620, where a second call graph is created for a second application, the second application configured to be executed on a second processor core. In this example, the second call graph includes a second function and second data. As described above with respect to FIG. 4, a call graph for a second application to be executed on a second CPU may include a function F1 416 and RO data D0 420.

Method 600 continues at 630, where a common sub-graph is identified between the first call graph and the second call graph. In this example, the common sub-graph includes the first function, the second function, first data, and second data. The common sub-graph may be identified by determining that function F1 408 has the same name as function F1 416. Also, the data D0 412 may be identical to the data D0 420. Common sub-graphs may be determined by analyzing the functions and data in various call graphs for the applications to be executed by the CPUs.

Method 600 continues at 640, where the program determines whether instructions in the first function match instructions in the second function, and determines whether the first data matches the second data. The process described above in 330 of method 300 provides one example of analyzing binary instructions and data values to find a match. The analysis may be performed for each function and data found in the common sub-graphs.

Method 600 continues at 650, where responsive to determining the instructions in the first function match the instructions in the second function, and the first data matches the second data, a compiler creates a binary with matched functions and matched data. The process described above in 340 of method 300 provides one example of this process. In an example, a compiler receives the shared code/data across the CPU binaries. The compiler translates and arranges all common code, RO data, and shared RW data to a shared address space in memory 106. Also, the compiler translates and arranges the CPU unique code/data to a CPU unique address space for each CPU. The binaries for each CPU are updated with the new addresses. Also, after this step, the real time address translation may be programmed.

Figure 7:
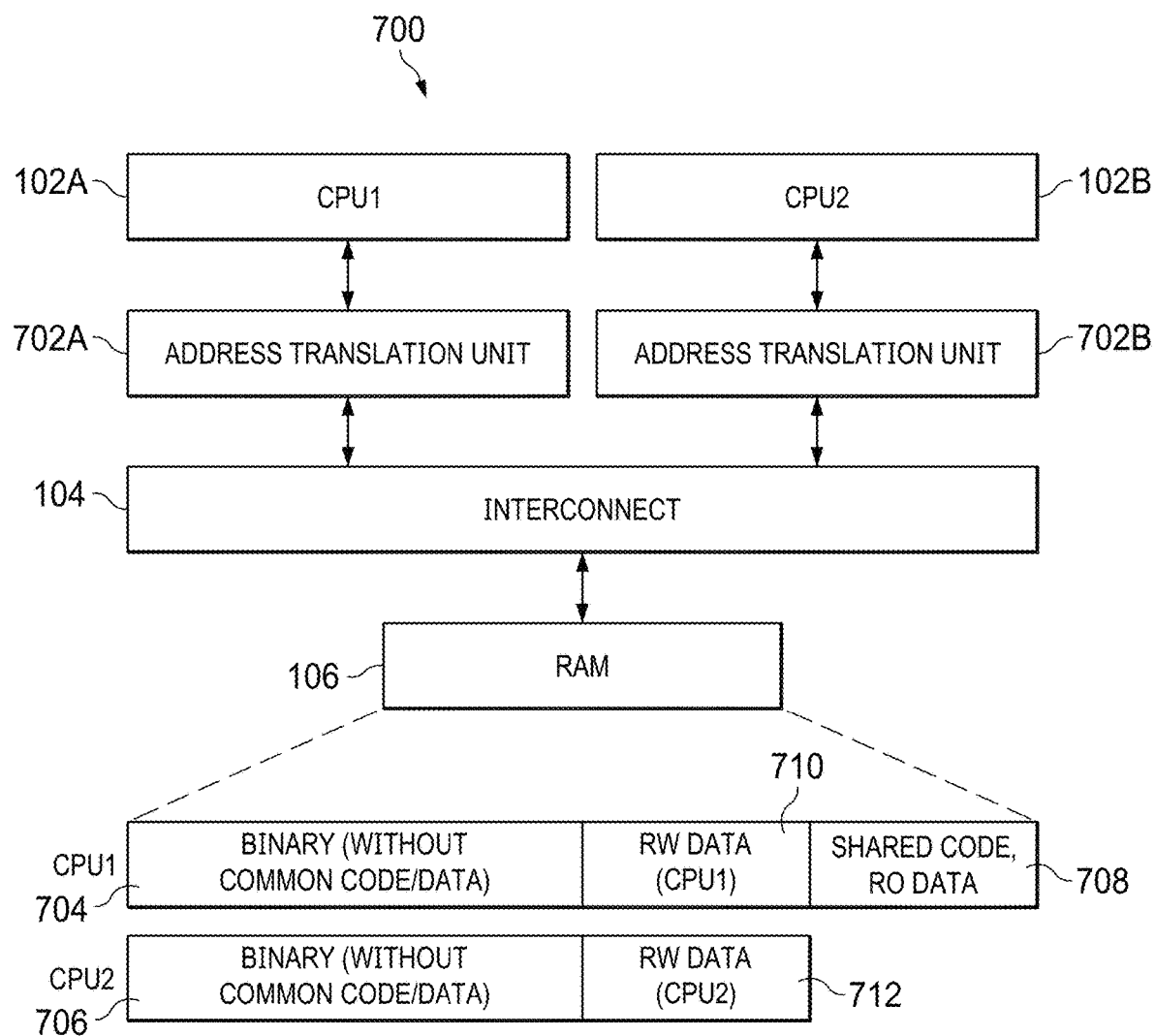
FIG. 7 is a block diagram of an example system for software sharing across multiple processing cores in a microcontroller in accordance with various examples.

FIG. 7 is a block diagram of an example system 700 for software sharing across multiple processing cores in a microcontroller in accordance with various examples herein. System 700 may include components in a microcontroller in one example. The components in system 700 may perform the examples described herein. System 700 includes CPU1 102A, CPU2 102B, interconnect 104, and memory 106. These components are described above with respect to FIG. 1. System 700 also includes address translation units 702A and 702B (collectively, address translation units 702). Memory 106 includes various regions in this example. The regions within memory 106 may be allocated for storing different types of code and/or data. A first region 704 stores code/data unique to CPU1 102A. A second region 706 stores code/data unique to CPU2 102B. A third region 708 stores shared code and RO data common to both CPU1 102A and CPU2 102B. A fourth region 710 stores RW data for CPU1 102A. A fifth region 712 stores RW data for CPU2 102B.

As described above with respect to FIG. 5, the code/data unique to CPU1 102A may begin at a first address (e.g., 0x1000, or region 704). The code/data unique to CPU2 102B may begin at a second address (e.g., 0x2000, or region 706). The shared code for both CPUs may begin at a third address (e.g., 0x3000). The shared RO data for both CPUs may begin at a fourth address (0x4000). In the example of FIG. 7, the shared code and RO data are shown as both found in region 708. In other examples, the shared code and RO data may have different regions. The RW data for CPU1 102A may begin at a fifth address (0x5000, or region 710). The RW data for CPU2 102B may begin at a sixth address (0x6000, or region 712).

Referring again to FIG. 7, five regions are shown for memory 106. However, in other examples, any number of regions may be useful. If more than two CPUs are present, other regions may be designated for code/data common to all the CPUs or code/data common to sub-groups of the CPUs. Memory 106 may be RAM or flash memory in some examples. In some examples, memory 106 may have multiple levels of memory, such as L1, L2, L3, etc.

In operation, system 700 provides deterministic low-latency address translation. Address translation units 702 may be lookup tables or comparators in some examples. Address translation units 702 translate addresses from CPU unique address space to shared code/data address space (e.g., region 708). Address translation may take one to two clock cycles in some examples. Address translations units may use any suitable hardware, software, digital logic, or digital circuitry to perform the address translations. In one example, address translation logic translates incoming addresses to outgoing addresses. A pass-through mechanism may be implemented for addresses where no translation is needed, such as addresses for CPU-unique code/data within regions 704 and 706. Address translation logic may define an address region from a starting point A to an ending point B in one example. If an address falls within the range between A and B, address translation logic translates the address. Multiple address regions may be specified for translation. Deterministic and low latency translations may be performed with a lookup table in one example, such as within one or two clock cycles. Addresses outside the address regions may pass through without translation in some examples.

Figure 8:
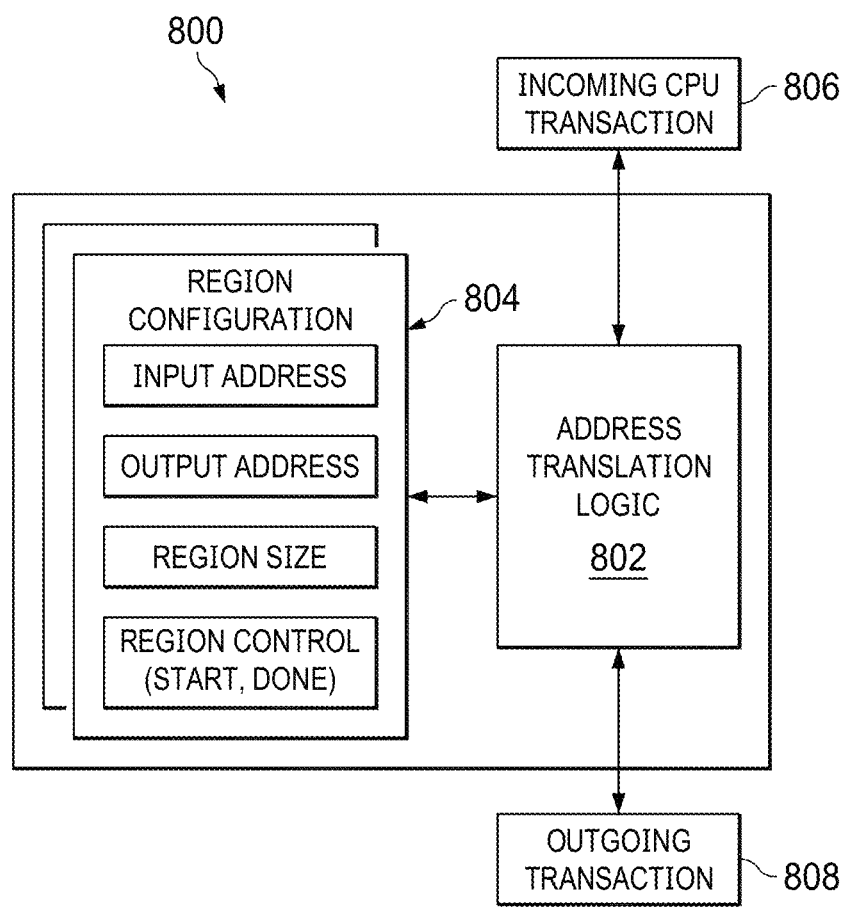
FIG. 8 is a block diagram of address translation logic in accordance with various examples.

FIG. 8 is a block diagram 800 of address translation logic in accordance with various examples herein. Diagram 800 includes address translation logic 802 and region configuration 804. The components in diagram 800 may be found in an address translation unit, such as address translation units 702A and/or 702B, in some examples. A lookup table or comparator may be implemented to perform address translation in one example. The region configuration 804 may include information such as input address, output address, region size, and region control (such as start and done locations for the region). The details for one region configuration 804 is shown here as an example; however, multiple regions may be defined for address translation as described herein. The information stored for each region may include input addresses, output address, region size, etc.

In one example, an incoming CPU transaction 806 is received by address translation logic 802. The address translation logic 802 determines an address associated with incoming CPU transaction 806 and determines whether address translation is performed. If the address is within a region of addresses that require translation, as described above, address translation logic 802 may receive an input address and determine an output address. The output address may be found in a lookup table in one example. Address translation logic 802 performs the translation to determine the output address, and then provides an outgoing transaction 808 that includes the output address for the shared memory address space in memory 106.

If the address in incoming CPU transaction 806 does not require translation, address translation logic 802 makes that determination and then passes the transaction through without performing address translation. In one example, instructions performed by CPU-unique code may not require translation.

Figure 9:
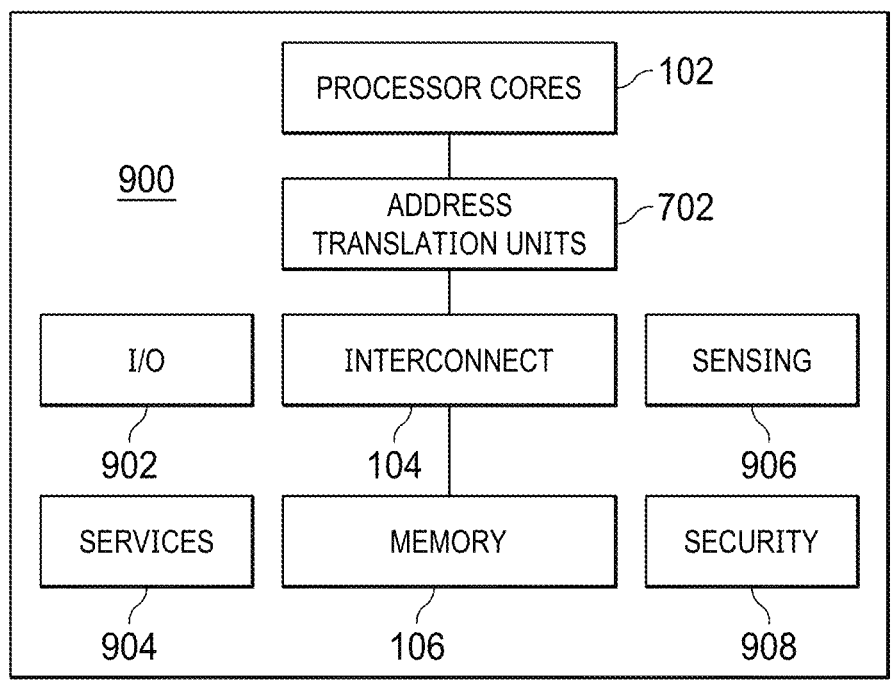
FIG. 9 is a block diagram of a microcontroller in accordance with various examples.

FIG. 9 is a block diagram of a microcontroller 900 in accordance with various examples herein. Microcontroller 900 is one example of a microcontroller that performs the examples described herein. System 700 may be incorporated into microcontroller 900 in one example. In this example, microcontroller 900 includes two or more processor cores 102. Microcontroller 900 may include any number of processor cores 102, such as 2, 4, or 8. Microcontroller 900 includes interconnect 104 and memory 106, which are described above. Microcontroller 900 includes address translation units 702. In some examples, one address translation unit 702 is included for each processor core 102. In other examples, a specialized processor core 102 such as an isolated core may be included in microcontroller 900.

Microcontroller 900 also includes input/output (I/O) 902 hardware for external connections, such as Ethernet, inter-integrated circuit (I2C), controller area network (CAN), serial peripheral interface (SPI), universal asynchronous receiver-transmitter (UART), etc. Microcontroller 900 also includes system services 904, such as power management, debug, firewall, direct memory access (DMA), error control coding (ECC), error signal module (ESM), etc. Microcontroller 900 includes sensing 906, which may include a comparator subsystem, analog-to-digital converters (ADC), digital-to-analog converters (DAC), encoder modules, a sigma-delta filter module (SDFM), pulse-width modulators (PWM), etc. Microcontroller 900 also includes security 908, which may include components such as secure boot, secure hash algorithms (SHA), a public key accelerator (PKA), a random number generator (RNG), etc. The components in microcontroller 900 are merely examples, and other microcontrollers may include more or fewer components in some examples.

In one example, microcontroller 900 includes CPU1 102A and CPU2 102B, where CPU1 102A is configured to execute a first application and CPU2 102B is configured to execute a second application. Microcontroller 900 includes a memory 106 configured to store code and data. The memory 106 has a first region configured to store code for CPU1 102A, a second region configured to store code for CPU2 102B, a third region configured to store shared code and read-only data for both CPU1 102A and CPU2 102B, a fourth region configured to store read-write data for CPU1 102A, and a fifth region configured to store read-write data for CPU2 102B. In other examples with more than two processing cores, memory 106 may include regions configured to stored code/data unique to other processing cores or code/data common to other combinations of processing cores.

In an example, microcontroller 900 also includes a first address translation unit 702A configured to receive a first address from CPU1 102A in a first CPU unique address space and translate the first address to a shared memory address space in the third region of the memory. Microcontroller 900 also includes a second address translation unit 702B configured to receive a second address from CPU2 102B in a second unique address space and translate the second address to the shared memory address space in the third region of the memory.

Figure 10:
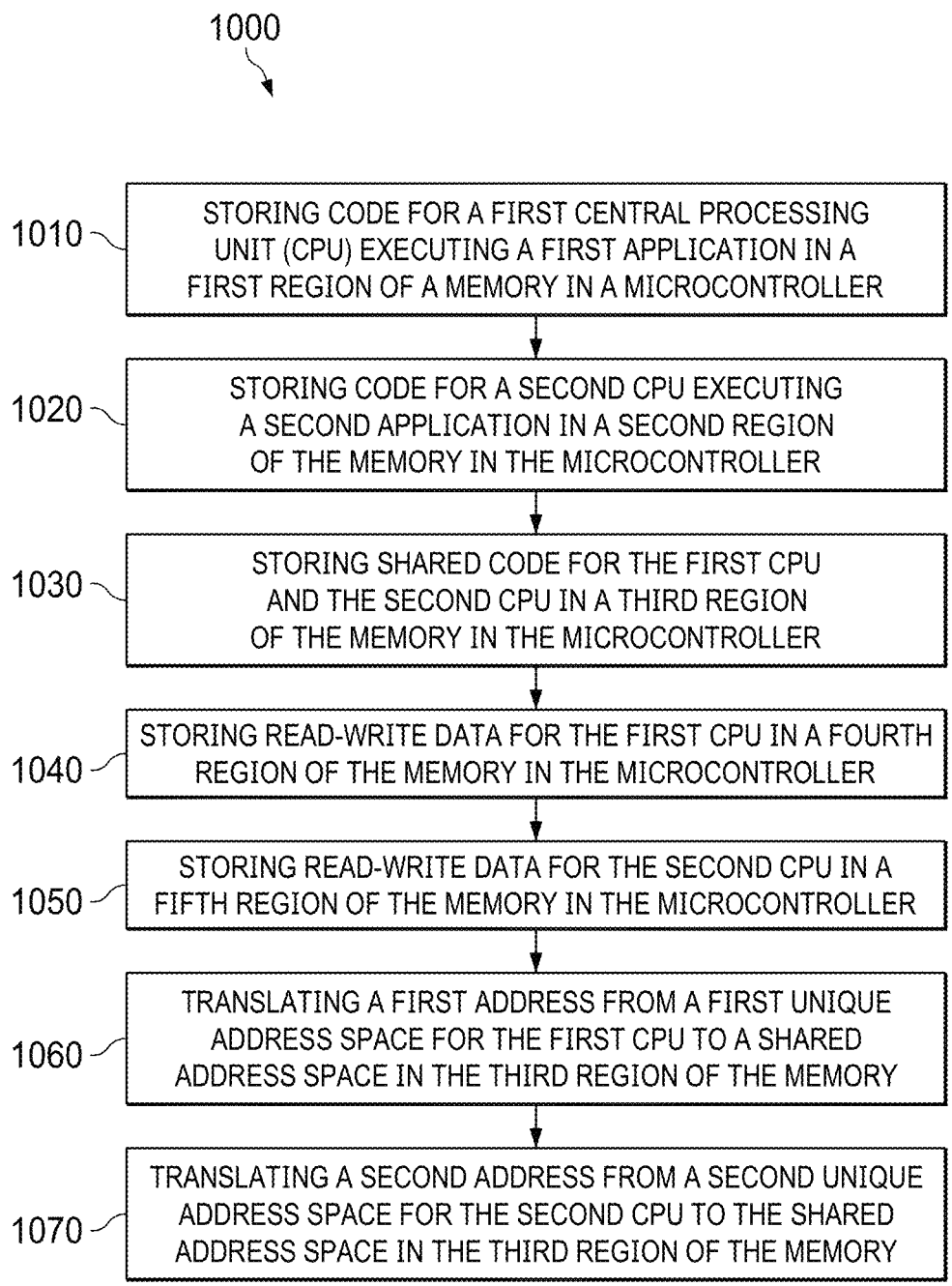
FIG. 10 is a flow diagram of a method for software sharing in accordance with various examples.

FIG. 10 is a flow diagram of a method 1000 for software sharing in accordance with various examples herein. The steps of method 1000 may be performed in any suitable order. Any suitable hardware or digital logic may perform method 1000 in some examples. A microcontroller such as microcontroller 900 may perform method 1000 in some examples.

Method 1000 begins at 1010, where a compiler or other suitable component stores code for a first CPU executing a first application in a first region of a memory in a microcontroller. The first CPU may be CPU1 102A in one example. The first application may be any application or function or sub-function executed by CPU1 102A. The first region of memory may be first region 704 as described above.

Method 1000 continues at 1020, where the compiler stores code for a second CPU executing a second application in a second region of the memory in the microcontroller. The second CPU may be CPU2 102B in one example. The second application may be any application or function or sub-function executed by CPU2 102B. The second region of memory may be second region 706 as described above.

Method 1000 continues at 1030, where the compiler stores shared code for the first CPU and the second CPU in a third region of the memory in the microcontroller. The third region of the memory may be third region 708 as described above. The shared code may be determined by the processes described herein, such as the examples described above with respect to FIGS. 3, 4, 5, and 6. In another example, the compiler may also store shared read-only data for the first CPU and the second CPU in the third region of the memory.

Method 1000 continues at 1040, where the compiler stores read-write data for the first CPU in a fourth region of the memory in the microcontroller. The fourth region of the memory may be fourth region 710 as described above.

Method 1000 continues at 1050, where the compiler stores read-write data for the second CPU in a fifth region of the memory in the microcontroller. The fifth region of the memory may be fifth region 712 as described above.

Method 1000 continues at 1060, where a first address translation unit translates a first address from a first unique address space for the first CPU to a shared address space in the third region of the memory. The first address translation unit may include any suitable hardware or logic as described herein, such as a lookup table or a comparator. The first address translation unit may be address translation unit 702A in one example.

Method 1000 continues at 1070, where a second address translation unit translates a second address from a second unique address space for the second CPU to a shared address space in the third region of the memory. The second address translation unit may include any suitable hardware or logic as described herein, such as a lookup table or a comparator. The second address translation unit may be address translation unit 702B in one example.

Figure 11:
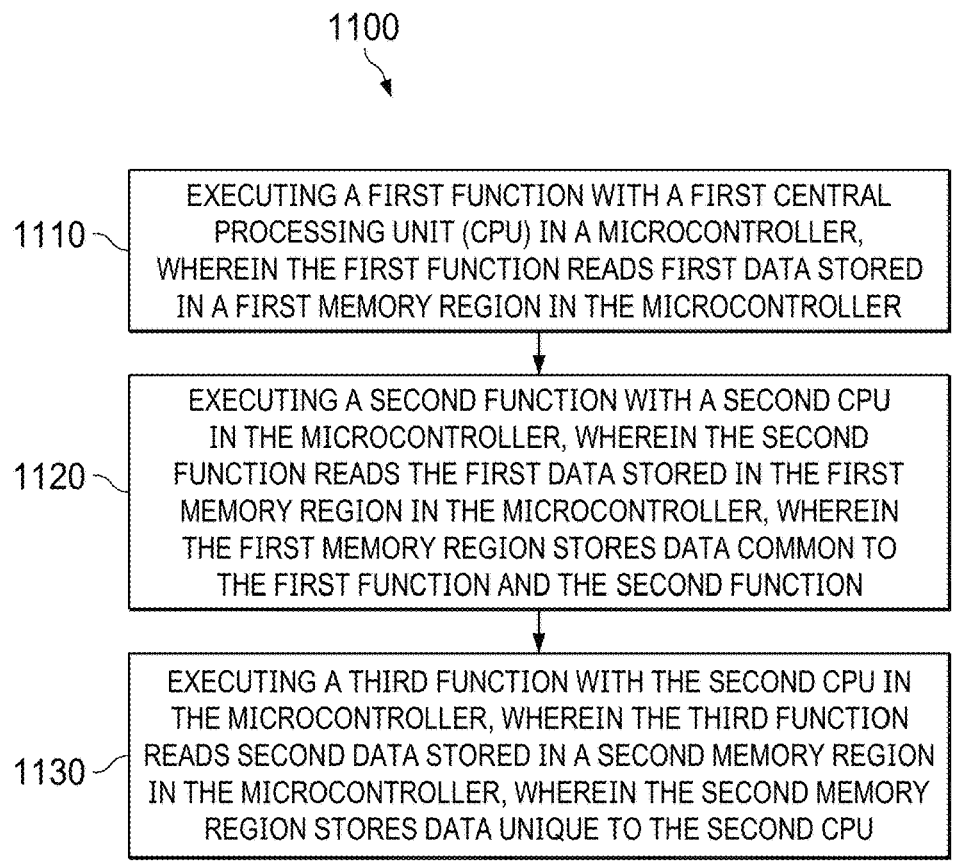
FIG. 11 is a flow diagram of a method for software sharing in accordance with various examples.

FIG. 11 is a flow diagram of a method 1100 for software sharing in accordance with various examples herein. The steps of method 1100 may be performed in any suitable order. Any suitable hardware or digital logic may perform method 1100 in some examples. A microcontroller such as microcontroller 900 may perform method 1100 in some examples.

Method 1100 begins at 1110, where a first CPU in a microcontroller executes a first function, where the first function reads first data stored in a first memory region in the microcontroller. The microcontroller may be microcontroller 900 in an example, and the first CPU may be CPU1 102A in an example. The first function may be any application or sub-function executed by CPU1 102A in an example. The first memory region may be third region 708 in an example. The first memory region may store data and/or code common to both CPU1 102A and CPU2 102B. In one example, executing the first function includes translating an address from a first CPU unique address space to a shared address space in the first memory region. The address may be translated by any suitable address translation unit in an example.

Method 1100 continues at 1120, where a second CPU in the microcontroller executes a second function, where the second function reads the first data stored in the first memory region in the microcontroller, where the first memory region stores data common to the first function and the second function (e.g., the shard address space). The second CPU may be CPU2 102B in an example. The second function may be any application or sub-function executed by CPU2 102B in an example.

Method 1100 continues at 1130, where the second CPU executes a third function, where the third function reads second data stored in a second memory region in the microcontroller. The second memory region stores data unique to the second CPU. The third function may be any application or sub-function executed by CPU2 102B in an example. The second memory region may be second region 706 in an example.

Figure 12:
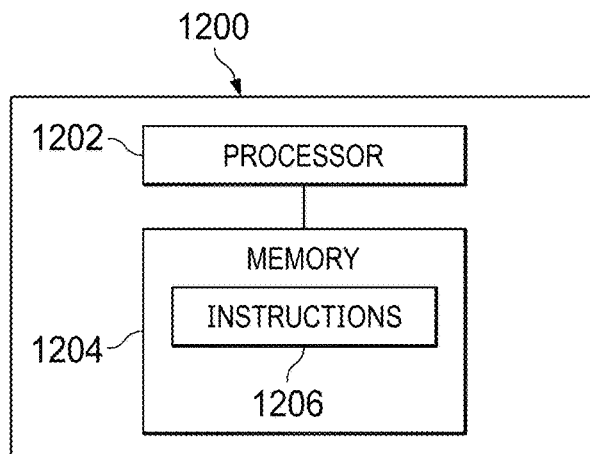
FIG. 12 is a block diagram of a computer system in accordance with various examples.

FIG. 12 is a block diagram of a computer system 1200 in accordance with various examples herein. System 1200 includes hardware components for executing a software sharing algorithm as described herein. System 1200 may be, for example, a personal computer, workstation, laptop or notebook computer, or other computing system configured for performing the functions described herein, particularly those functions related to the software sharing algorithm described with respect to FIGS. 3, 4, and 6 herein.

System 1200 may include one or more processors 1202 and one or more memories 1204. Memory 1204 may include any suitable data, code, logic, or instructions 1206. The processor 1202 is configured to read and execute computer-readable instructions. For example, the processor 1202 is configured to invoke and execute instructions in a program stored in the memory 1204, including instructions 1206. Instructions 1206 may perform a software sharing algorithm as described herein in one example. In an example, the memory 1204 may be integrated with the processor 1202. The memory 1204 is configured to store various software programs and/or multiple groups of instructions, including the instructions 1206. The memory 1204 may include one or more storage devices. For example, the memory 1204 includes a high-speed random-access memory and/or may include a nonvolatile memory such as one or more disk storage devices, a flash memory, another nonvolatile solid-state storage device, or a pseudo-static random-access memory (PSRAM). The memory 1204 may store an OS such as ANDROID, IOS, WINDOWS or LINUX. The memory 1204 may further store a network communications program. The network communications program is useful for performing communications with one or more attached devices, one or more user devices, or one or more network devices. The memory 1204 may further store a user interface program. The user interface program displays content of an application through a graphical interface and receives data or an operation performed by a user on the application via an input control such as a menu, a dialog box or a physical input device (not shown). The memory 1204 is configured to store the instructions 1206 for implementing the various methods and processes provided in accordance with the various examples of this description.

In another example, elements of system 1200 disclosed herein may use any combination of dedicated hardware and instructions stored in a non-transitory medium, such as memory 1204. The non-transitory medium includes all electronic mediums or media of storage, except signals. Processor 1202 may include one or more microcontrollers, application-specific integrated circuits (ASICs), CPUs, graphics processing units (GPUs), and/or other processing resources configured to execute instructions 1206 stored on the medium. Examples of suitable non-transitory computer-readable media include one or more flash memory devices, battery-backed RAM, solid state drives (SSDs), hard disk drives (HDDs), optical media, and/or other memory devices suitable for storing the instructions 1206 for the processor 1202.

In examples herein, applications to be executed on each processing core are analyzed to identify common shared code and/or data segments among the applications. An automated software algorithm may be useful for analyzing the applications and finding the common code and/or data. After analyzing the applications or application binaries, new binaries may be created. The new binaries may include a unique binary for each processing core that includes no common code/data, and a binary that includes shared code, read-only data common to two or more processing cores, and shared read-write data. After the applications are analyzed, a bootloader may be updated to load the unique code/data for each processing core, load the shared code and read-only data once, and load read-write data multiple times, once for each processing core. By loading shared code and read-only data once rather than multiple times, memory usage may be reduced.

During operation, an MCU may utilize a low-latency hardware translation to translate addresses from the CPU-unique address space of each processing core to the shared memory address space. A lookup table or comparator may perform address translation using a 1:1 mapping of addresses. Address translation hardware may be coupled to each processing core in one example. With the address translation scheme, an MMU is not needed, and the examples herein may be implemented on an MCU.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A method, comprising:
   storing first code associated with execution of a first application by a first central processing unit (CPU) in a first region of a memory in a device, wherein the device includes a plurality of CPUs each having access to the memory, and wherein the memory includes a plurality of regions each corresponding to an address space between a starting address and an ending address;
   storing second code associated with execution of a second application by a second CPU in a second region of the memory, wherein the execution of the first application includes execution of the first code and shared code, but not the second code, and access of read-write data, and wherein the execution of the second application includes execution of the second code and the shared code, but not the first code, and access of the read-write data;
   storing the shared code in a third region of the memory;
   storing the read-write data in a fourth region and a fifth region of the memory;
   translating a first address from the first CPU to access the third region of the memory; and
   translating a second address from the second CPU to access the third region of the memory.

2. The method of claim 1, further comprising:
   translating a third address from the first CPU to access the fourth region of the memory.

3. The method of claim 1, wherein translating the first address includes translating the first address based on a lookup table.

4. The method of claim 1, further comprising:
   storing third code associated with execution of a third application by a third CPU in a sixth region of the memory.

5. The method of claim 1, further comprising:
   passing through a third address from the first CPU without translation to access the first region of the memory.

6. The method of claim 1, wherein:
   the execution of the first application further includes access of read-only data, and the execution of the second application further includes access of the read-only data; and
   the method further comprises storing the read-only data in the third region of the memory.

7. A method, comprising:
   executing a first function using a first central processing unit (CPU) in a microcontroller, wherein executing the first function includes reading first data stored in a first region of a memory in the microcontroller, and wherein the memory includes a plurality of regions each corresponding to an address space between a starting address and an ending address;
   executing a second function using a second CPU in the microcontroller, wherein executing the second function includes reading the first data stored in the first region of the memory, and wherein the first region stores read-only data accessed by both the first CPU and the second CPU; and
   executing a third function using the second CPU, wherein executing the third function includes reading second data stored in a second region of the memory, wherein the second region stores read-only data accessed by only the second CPU.

8. The method of claim 7, further comprising:
   executing a fourth function using the first CPU, wherein executing the fourth function includes reading third data stored in a third region of the memory, and wherein the third region stores read-only data accessed by only the first CPU.

9. The method of claim 8, wherein executing the first function further includes reading fourth data stored in a fourth memory region of the memory, and wherein the fourth region stores read-write data accessed by only the first CPU.

10. The method of claim 7, wherein executing the first function includes translating an address from the first CPU to access the first region.

11. The method of claim 10, wherein translating the address includes translating the address using a lookup table.

12. The method of claim 10, wherein translating the address includes translating the address using a comparator.

13. The method of claim 7, wherein executing the first function includes using an address from the first CPU without translation to access the first region.

14. The method of claim 7, wherein the memory is a random access memory (RAM).

15. A microcontroller, comprising:
    a first central processing unit (CPU) configured to execute a first application;
    a second CPU configured to execute a second application;
    a memory configured to be accessible by the first CPU and the second CPU using an address space shared by the first CPU and the second CPU, wherein the memory has a first region configured to store code unique to the first application, a second region configured to store code unique to the second application, a third region configured to store code and read-only data shared by both the first application and the second application, a fourth region configured to store read-write data unique to the first application, and a fifth region configured to store read-write data unique to the second application, and wherein the first, second, third, fourth, and fifth region each corresponds to a portion of the shared address space between a starting address and an ending address;
    a first address translation unit configured to translate a first address from the first CPU to the shared address space to access the third region of the memory; and
    a second address translation unit configured to translate a second address from the second CPU to the shared address space to access the third region of the memory.

16. The microcontroller of claim 15, wherein the first address translation unit is configured to translate the first address using a lookup table.

17. The microcontroller of claim 15, wherein the first address translation unit is configured to translate the first address using a comparator.

18. The microcontroller of claim 15, further comprising:
    a third CPU configured to execute a third application; and
    a third address translation unit configured to translate a third address from the third CPU to the shared address space to access the third region of the memory.

19. The microcontroller of claim 15, wherein the first address translation unit is configured to pass through a third address from the first CPU without address translation to access the first region of the memory.

20. The microcontroller of claim 15, wherein the memory is a random access memory (RAM).

\* \* \* \* \*